United States Patent [19]

Ishida et al.

[11] Patent Number: 5,190,768

[45] Date of Patent: Mar. 2, 1993

[54] APPARATUS FOR GRANULATING PLASTICS

[75] Inventors: Yasuhiko Ishida; Minoru Yoshida, Hideki Mizuguchi, Sakaaki Okita, Tetsuo Makida, all of Hiroshima, Japan

[73] Assignee: The Japan Steel Works, Ltd., Tokyo, Japan

[21] Appl. No.: 704,148

[22] Filed: May 22, 1991

[30] Foreign Application Priority Data

May 22, 1990 [JP] Japan .................................. 2-130240

[51] Int. Cl.⁵ ...................... B29C 47/00; B29C 71/00
[52] U.S. Cl. ..................................... 425/67; 264/142;
425/142; 425/171; 425/310; 425/313
[58] Field of Search ........................... 72/254; 83/675;
264/142; 425/67, 142, 171, 313, 310, 311

[56] References Cited

U.S. PATENT DOCUMENTS

| | | | |
|---|---|---|---|
| 3,685,751 | 8/1972 | Anders | 425/311 |
| 3,832,114 | 8/1974 | Yoshida | 425/313 |
| 3,912,434 | 10/1975 | Nagahara et al. | 425/142 |
| 4,529,370 | 7/1985 | Holmes et al. | 425/142 |
| 5,110,523 | 5/1992 | Guggiari | 264/40.5 |

FOREIGN PATENT DOCUMENTS

| | | |
|---|---|---|
| 0418941 | 3/1991 | European Pat. Off. |
| 1964413 | 7/1971 | Fed. Rep. of Germany |
| 2759111 | 10/1978 | Fed. Rep. of Germany |
| 3405978 | 4/1985 | Fed. Rep. of Germany |
| 2620364 | 3/1989 | France |
| 1-225511 | 9/1989 | Japan |

OTHER PUBLICATIONS

Patent Abstracts of Japan, vol. 6, No. 33 (M-114)(911) Feb. 27, 1982 & JPA 56-148510, Nov. 18, 1981.
Patent Abstracts of Japan, vol. 3, No. 95 (C-55) Aug. 11, 1979 & JPA 54-072261, Sep. 6, 1979.
Database WPIL, No. 89-304921 [42], Derwent Publ., Ltd. London GB & JPA 1-225511, Sep. 8, 1989.

Primary Examiner—Jay H. Woo
Assistant Examiner—Scott Bushey
Attorney, Agent, or Firm—Sughrue, Mion, Zinn, Macpeak & Seas

[57] ABSTRACT

A plastics granulating apparatus includes a cutter holder having cutter knives driven to rotate along a die surface of a die and a housing provided with a cutter drive shaft for driving the cutter holder to rotate in a manner so that plastics particles are obtained by cutting resin extruded from the die with the cutter knives, wherein a sleeve is axially movably provided in the housing so as to coaxially rotatably hold the cutter drive shaft, and a pressure medium is supplied into space chambers formed between the sleeve and the housing so that the cutter drive shaft moves axially with axial movement of the sleeve.

3 Claims, 3 Drawing Sheets

APPARATUS FOR GRANULATING PLASTICS

BACKGROUND OF THE INVENTION

The present invention generally relates to a plastics granulating method and apparatus, and particularly relates to a novel improvement of the plastics granulating method and apparatus in which a pressure medium is supplied to move the cutter drive shaft forward/backward so that cutter knives or the like can be easily exchanged.

As the plastics granulating apparatus of the kind as described above, conventionally, various plastics granulating apparatuses have been used. As a typical one of the configurations of those apparatuses, description will be made of the device disclosed in Japanese Patent Unexamined Publication No. Hei-1-225511, as shown in FIGS. 2 and 3.

In the drawings, reference numeral 1 designates a granulating machine. The granulating machine 1 is constituted by a manifold 2 for circumferentially distributing melted resin extruded from an extruding machine (not shown), a die 3 attached on the manifold 2 so as to closely contact therewith, a cutter casing 4 attached on a die surface 3a of the die 3, and a cutter 5 provided in the cutter casing 4.

The die 3 is disc-like shaped, and a large number of nozzles 6 are formed axially through a ring-like region of the die 3 surrounding the center of the same. Ends of the nozzles 6 are opened into a ring-like resin path 2a of the manifold 2 and into the cutter casing 4, respectively.

The cutter casing 4 is removably fixed on the manifold 2 through bolts 7 so as to closely contact with the surface of the die 3. The cutter casing 4 has a hot-water inlet 8 and a hot-water outlet 9 so as to be always filled with hot water.

The cutter 5 has a configuration so that a plurality of cutter knives 11 are radially fixedly supported on the outer circumference of an end surface of a cutter holder 10 facing the die 3. The cutter knives 11 are provided so as to be in opposition to the die surface 3a of the die 3, that is, in opposition to the surface of the ring-like region through which the nozzles 6, 6, ... are formed. A rotary force is transmitted to the cutter holder 10 through a cutter drive shaft 12 disposed on the central axial line of the cutter holder 10.

The cutter drive shaft 12 is rotatably supported in a cylindrical casing 13 through bearings 14 and supported so as to be fixed axially with respect to the casing 13. The casing 13 is axially slidably supported by a housing 15 fixed on the back surface of the cutter casing 4. Therefore, the cutter drive shaft 12 is made to be axially movable together with the casing 13. A fine adjustment mechanism 19 constituted by a worm 16, a worm wheel 17, and adjustment screws 18 is provided between the housing 15 and the casing 13 so that the casing 13 can be axially finely moved by the rotation of the worm 16. A compression spring 20 is provided between a rear end portion (a right end portion in FIG. 2) of the casing 13 and the housing 15 so as to urge the casing 13 and the cutter drive shaft 12 against the die 3 so as to minimize an axial play of the cutter driving shaft 12 due to gaps of the bearings 14, a play of the screws of the fine adjustment mechanism 19 or the like.

The base end of the cutter drive shaft 12 is coupled with an output shaft 22 of a rotary machine (not shown), such as a motor or the like, through a coupling 21 which allows fine axial movement of the cutter drive shaft 12.

A gap portion between the base end portion of the cutter drive shaft 12 and a housing portion 15a surrounding the base end portion is sealed by a pair of front and rear sealing members 23 and an oil reservoir 24 is formed in the gap portion. The oil reservoir 24 is configured so as to be communicated with an oil chamber 27 on the small-diameter piston 26 side of a booster 25 provided outside the housing 15. High pressure air is fed from a pressure air source (not shown) into a pressure chamber 29 in the booster 25 on the large-diameter piston 28 side through a change-over valve 30, a reducing valve 31, and an air valve 32. The change-over valve 30 is configured so that the pressure chamber 29 of the booster 25 is opened into the atmosphere when the change-over valve 30 is switched to the illustrated position and the pressure chamber 29 and the reducing valve 31 are communicated with each other when the change-over valve 30 is switched to the left position.

An oil hole 33 is formed in the base end portion of the cutter drive shaft 12 so as to be opened into the oil reservoir 24 provided in the surrounding of the base end portion. An oil path 34 is formed through the central portion of the cutter drive shaft 12 from the front end surface thereof, that is, the end surface at the die 3 side, to the oil hole 33 of the base end portion.

Next, as shown in FIG. 3, the cutter holder 10 is shaped so as to be substantially conical and cylindrical, and configured so that a front end portion of the cutter drive shaft 12 is slidably fitted into the cutter holder 10 and an 0 ring 35 is provided between the inner circumferential surface of the cutter holder 10 and the outer circumferential surface of the cutter drive shaft 12. Further, a blanking cover 37 is attached on the end surface of the cutter holder 10 at the die 3 side through a gasket 36, and an oil-tight closed chamber 38 is formed between the cutter holder 10 and the front end surface of the cutter drive shaft 12. Pressure oil is led into the closed chamber 38 through the oil path 34 formed in the cutter drive shaft 12.

A torque transmission disc plate 40 having an involute spline 39 formed in its outer circumferential surface is fixed on the front end surface of the cutter drive shaft 12. A torque transmission ring 42 having an involute spline 41 formed in its inner circumferential surface, on the other hand, is fixed in the cutter holder 10. Consequently, by making the splines 39 and 41 engage with each other, the rotary force from the cutter drive shaft 12 is transmitted to the cutter holder 10 and the cutter holder 10 is supported so as to be slidable relative to the cutter drive shaft 12 while the rotary force from the cutter drive shaft 12 is transmitted to the cutter holder 10.

Compression springs 43 are provided between the torque transmission disc plate 40 fixed on the front end surface of the cutter drive shaft 12 and the cutter holder 10 so that the cutter holder 10 is always urged by the springs 43 downward, that is, in the direction to separate from the die 3.

Next, description will be made as to the operation of the cutter position adjustment device in the granulating apparatus configured as described above.

First, when the die 3 is cleaned, the cutter knives 11 are replaced, or the like, the housing 15 is mounted on a truck 44 as shown by a phantom line in FIG. 2 and the bolts 7 coupling the cutter casing 4 and the die 3 with each other are removed. Then, the truck 44 is made to move so that the whole cutter device constituted by the cutter casing 4 and the housing 15 can be separated from the die 3. As a result, since a sufficient working space can be secured between the die 3 and the cutter 5, the cleaning work, the exchanging work, or the like can be easily performed.

After completion of the work, the cutter casing 4 is made to closely contact with the die 3 and fixed thereon through the procedure reverse to the foregoing, and adjustment of the cutter position can be performed while the extruding machine is left as it is in the stopped state.

To perform the positional adjustment, first, the fine adjustment mechanism 19 is operated to thereby retreat, at the maximum extent, the cutter drive shaft 12 together with the casing 13. Next, the air valve 32 is opened and the change-over valve 30 is switched to the left position, so that air having pressure adjusted by the reducing valve 31 is led into the pressure chamber 29 of the booster 25, and pressured working oil is sent from the oil chamber 27 of the booster 25 into the oil reservoir 24 in the surrounding of the base end portion of the cutter drive shaft 12. Then, the high-pressure working oil flows into the closed chamber 38 provided in the cutter drive shaft 12 on the front end side through the oil hole 33 and oil path 34 formed in the cutter drive shaft 12. As a result, the cutter holder 10 advances toward the die 3, and the cutter knives 11 come close to the die surface 3a.

When the cutter holder 10 advances to the cutter drive shaft 12 by a full stroke, the cutter holder 10 abuts on the torque transmission disc plate 40 fixed on the front end surface of the cutter drive shaft 12 as shown in FIG. 3 so that the cutter holder 10 is limited so as not to further advance. Then, the fine adjustment mechanism 19 is operated in this state to thereby make the cutter 5 slightly advance together with the cutter drive shaft 12 and the casing 13 so as to adjust a gap between the cutter knives 11 and the die surface 3a. When the cutter knives 11 are urged against the die surface 3a, the cutter knives 11 are made to closely contact with the die surface 3a, and the pressure in the closed chamber 38 is adjusted by the reducing valve 31.

After completion of the positional adjustment of the cutter 5, the change-over valve 30 is switched to the illustrated position so that the pressure chamber 29 of the booster 25 is opened into the atmosphere. As a result, the pistons 26 and 28 in the booster 25 are made free to thereby reduce the pressure in the closed chamber 38. Then, the cutter holder 10 is retreated by the urging force of the compression springs 43 before the blanking cover 37 abuts on the torque transmission die plate 40 provided on the front end surface of the cutter drive shaft 12. As a result, the cutter knives 11 are sufficiently separated form the die surface 3a as shown in FIG. 2.

Next, when granulation is to be performed, the change-over valve 30 is switched to the left position to thereby supply high-pressure air into the pressure chamber 29 of the booster 25. As a result, the cutter knives 11 advance to the first set position. Next, the extruding machine is operated, and the cutter drive shaft 12 is driven to rotate by the rotary machine such as a motor or the like through the coupling 21. Then, the rotary force is transmitted to the cutter holder 10 through the splines 39 and 41, so that the cutter knives 11 rotate along the die surface 3a. Therefore, melted resin continuously pushed out of the extruding machine through the resin path 2a and the nozzles 6, 6, ... of the die 3 is finely cut by the cutter knives 11, and processed so as to be granulated. The thus processed resin pellets are solidified in hot water in the cutter casing 4, and discharged from the hot water outlet 9 together with the hot water.

Having such a configuration as described above, the conventional plastics granulating apparatus has the following problems.

(1) It is generally necessary to exchange cutter knives every one—three months. The configuration has been made such that the oil path 34 is formed in the rotary shaft 12 and the contact state between the cutter knives 11 and the die surface 3a is changed by changing the pressure in the closed chamber 38 formed in the cutter holder 10. It has been therefore necessary to remove the blanking cover 37 of the cutter holder 10 at the time of exchange of the cutter knives, and the removal of the blanking cover allows 37 an oil in the oil path 34 to leak outside to thereby make the exchanging work very difficult.

Further, since it is necessary to prevent air from entering
the oil path when the cutter holder is mounted, high cost and long time periods are required for maintenance, resulting in a large obstacle.

(2) The limit of the life of the cutter knives 11 is about 2 mm in term of the abrasion width thereof. If the abrasion width exceeds the limit, the contact width of the edge surface increases to thereby generate defective cutting of extruded melted resin. The abrasion state of the cutter knives 11 is therefore very important to perform quality control of product pellets. In the conventional configuration, however, the abrasion state of the cutter knives 11 cannot be observed from the outside during continuous operation thereof. Accordingly, there has been no measure other than a method in which the machine is once stopped, the bolts 7 coupling the cutter casing 4 and the die 3 with each other are removed so as to separate the whole cutter device from the die 3, the truck 44 is retreated so as to separate the die 3 and the housing 15 from each other, and the abrasion state of the cutter knives 11 is inspected by sight.

(3) Further, in use, the high-pressure air adjusted so as to have a predetermined pressure by the reducing valve 31 in advance is converted from air pressure into oil pressure in the booster 25 prior to the start of rotation of the cutter knives 11, and then the converted pressure oil is led into the closed chamber 38 through the oil reservoir 24 and the oil path 34 to thereby urge the cutter holder 10 toward the die 3 so that the cutter knives 11 are urged against the die surface 3a by the predetermined pressure and are made to start rotation.

If the cutter knives 11 are made to start rotation to thereby cut melted resin continuously pushed out of the nozzles 6 in hot water led into the cutter casing 4, the cutting angle of the cutter knives generates a thrust in the cutter knife 11 so as to urge the cutter knives 11 toward the die surface 3a by the action due to the rotary force of the cutter knives 11. The thrust changes in proportion to the rotational speed. That is, the thrust becomes large as the rotational speed becomes high.

The contact surface pressure between the cutter knives 11 and the die surface 3a is increased by the thrust, and if the surface pressure exceeds a predetermined value, the cutter knives 11 are rapidly worn away to thereby shorten the life thereof.

The springs 43 are therefore interposed between the torque disc plate 40 fixed on the front end surface of the cutter drive shaft 12 and the cutter holder 10 so that the urging force of the springs 43 act against the thrust to thereby prevent the contact surface pressure between the cutter knives 11 and the die surface 3a from exceeding an abrasion limit value in use as described above.

With the conventional configuration, however, it has become impossible to cope with a recent tendency of increase in size of the extruding machine and increase in quantity of treatment.

That is, the thrust to be generated in the cutter knives 11 becomes larger and larger because of the increase in size of the cutter holder 10, the increase in number of the cutter knives 11, and the increase in rotational speed of the cutter knives 11, so that it has become impossible to provide springs having a sufficient force against the increased thrust, in the cutter holder 10, because of the limitation in the mounting space. As a result, the thrust due to the rotation exceeds the allowable capability of the springs 43 so that the cutter knives 11 are urged against the die surface 3a by abnormal pressure to thereby promote the abrasion of the cutter knives 11 and to shorten the life thereof.

(4) A configuration such that fluid pressure is applied to the rotating cutter holder 10 through the oil path formed in the rotary cutter drive shaft 12 is exceedingly complicated so that trouble such as oil leakage or the like has been caused, and a very high cost and large labor have been required. An improvement in reliability is therefore desirable.

SUMMARY OF THE INVENTION

The present invention has been accomplished to solve the foregoing problems in the prior art, and particularly to provide a method for granulating plastics and an apparatus therefor, in which a pressure medium is supplied not through a cutter drive shaft to thereby move the cutter drive shaft forward/backward so that the exchange of cutter knives or the like can be easily performed.

According to the present invention, a plastics granulating method in which melted resin extruded from a die is cut so as to be formed into plastics particles by using cutter knives rotating in water along a die surface of the die while contacting with the die surface, includes the steps of: acting a force reverse in direction to a thrust generated by the rotation of the cutter knives on an axial slide mechanism for the cutter knives by using a pressure medium; and controlling contact surface pressure between the die surface and the cutter knives.

In particular, in the method, the pressure of the pressure medium is made adjustable by means of pressure adjustment valves.

Also, in the method, the pressure adjustment valves are controlled in proportion to the rotational speed of the cutter knives.

According to the present invention, a plastics granulating apparatus includes a die 1a cutter drive shaft, and a cutter holder having cutter knives driven to rotate along a die surface of the die. A housing is provided with the cutter drive shaft for driving the cutter holder to rotate in a manner that plastics particles are obtained by cutting resin extruded from the die by means of the cutter knives. A sleeve is axially movably provided in the housing so as to coaxially rotatably hold the cutter drive shaft and space chambers are defined by the sleeve and the housing. A pressure medium is supplied into the space chambers so that the cutter drive shaft moves axially with axial movement of the sleeve.

More in detail, in the apparatus, the pressure medium is supplied into the space chambers through pressure adjustment valves.

Also, in the apparatus, a detection means is provided in the housing and a positional relation between the housing and the sleeve is detected by the detection means to thereby detect an abrasion state of the cutter knives.

In the plastics granulating method and apparatus according to the present invention, a pressure medium is supplied to the axial slide mechanism for the cutter knives so as to make a force act in the direction reverse to a thrust generated by the rotation of the cutter knives. As a result, the contact surface pressure between the die surface and the cutter knives can be controlled so that the pressing force against the thrust due to the cutter knives is made to sufficiently act to thereby make it possible to adjust the contact surface pressure between the cutter knives and the die surface to be in a desired state.

Further, when the cutter knives are to be exchanged, the exchanging work can be easily performed only by removing the bolts because no pressure medium is housed in the cutter holder.

BRIEF DESCRIPTION OF THE DRAWINGS

FIGS. 2 and 3 show the conventional granulating apparatus, in which FIG. 2 is a partially sectional view showing the whole configuration; and FIG. 3 is an enlarged sectional view showing the main part of FIG. 2.

DETAILED DESCRIPTION OF THE PREFERRED EMBODIMENTS

Description will be made in detail below as to preferred embodiments of the plastics granulating method and apparatus according to the present invention with reference to the accompanying drawing.

Portions the same as or corresponding to those in the conventional example are correspondingly referenced.

Figure 1:
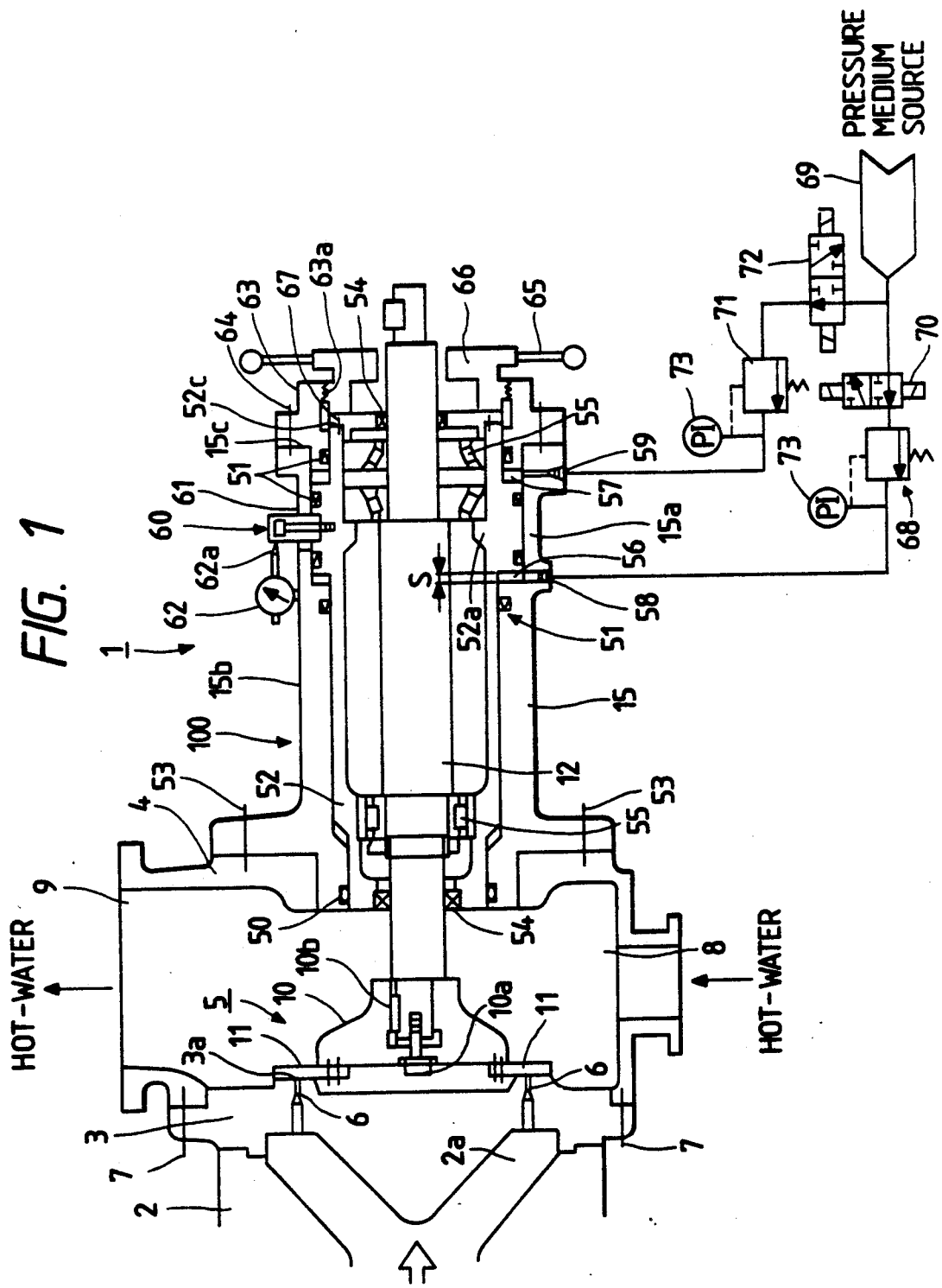
FIG. 1 is a partially sectional view showing the configuration of a preferred embodiment of the plastics granulating apparatus according to the present invention.
Figure 2:
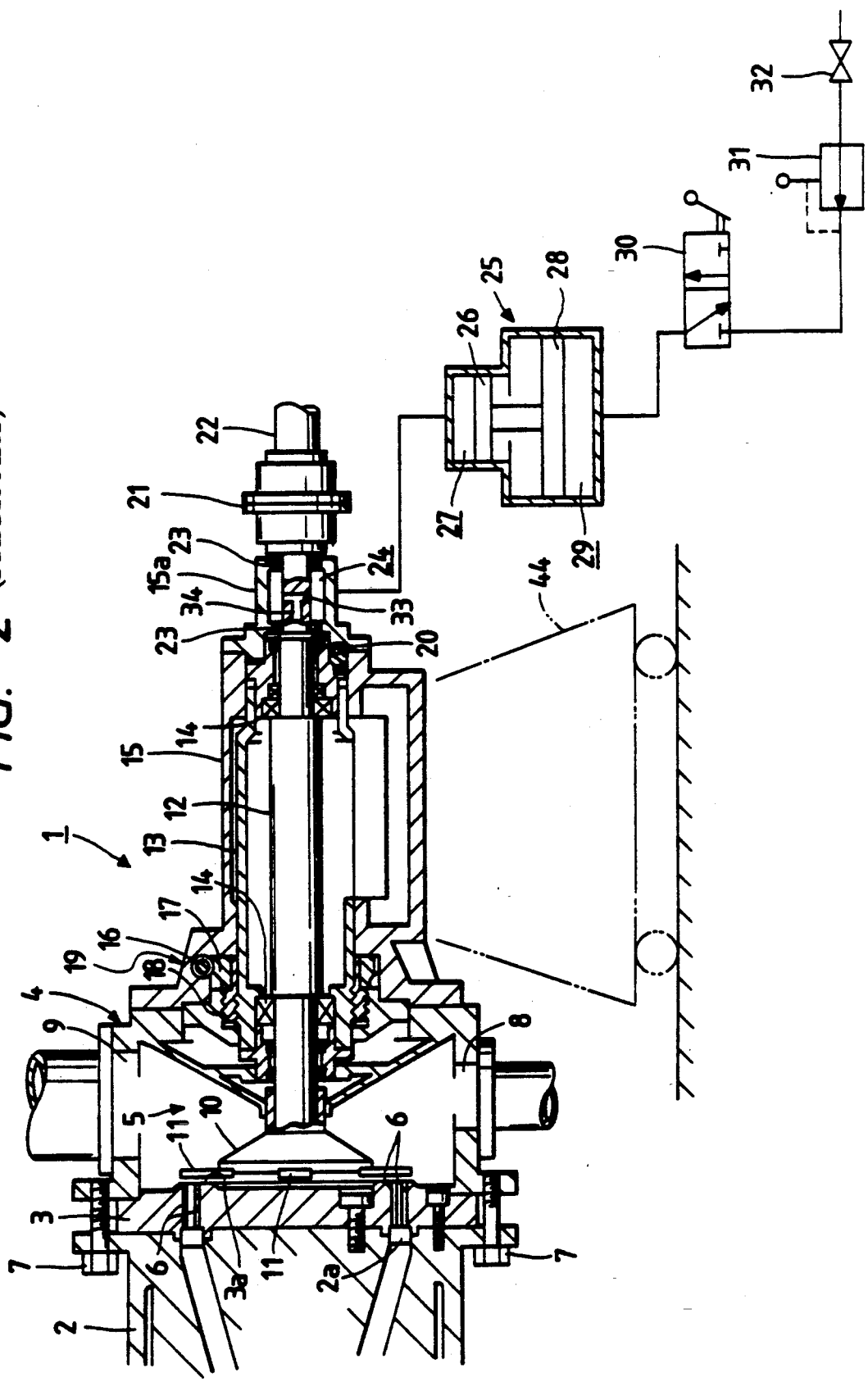
Figure 3:
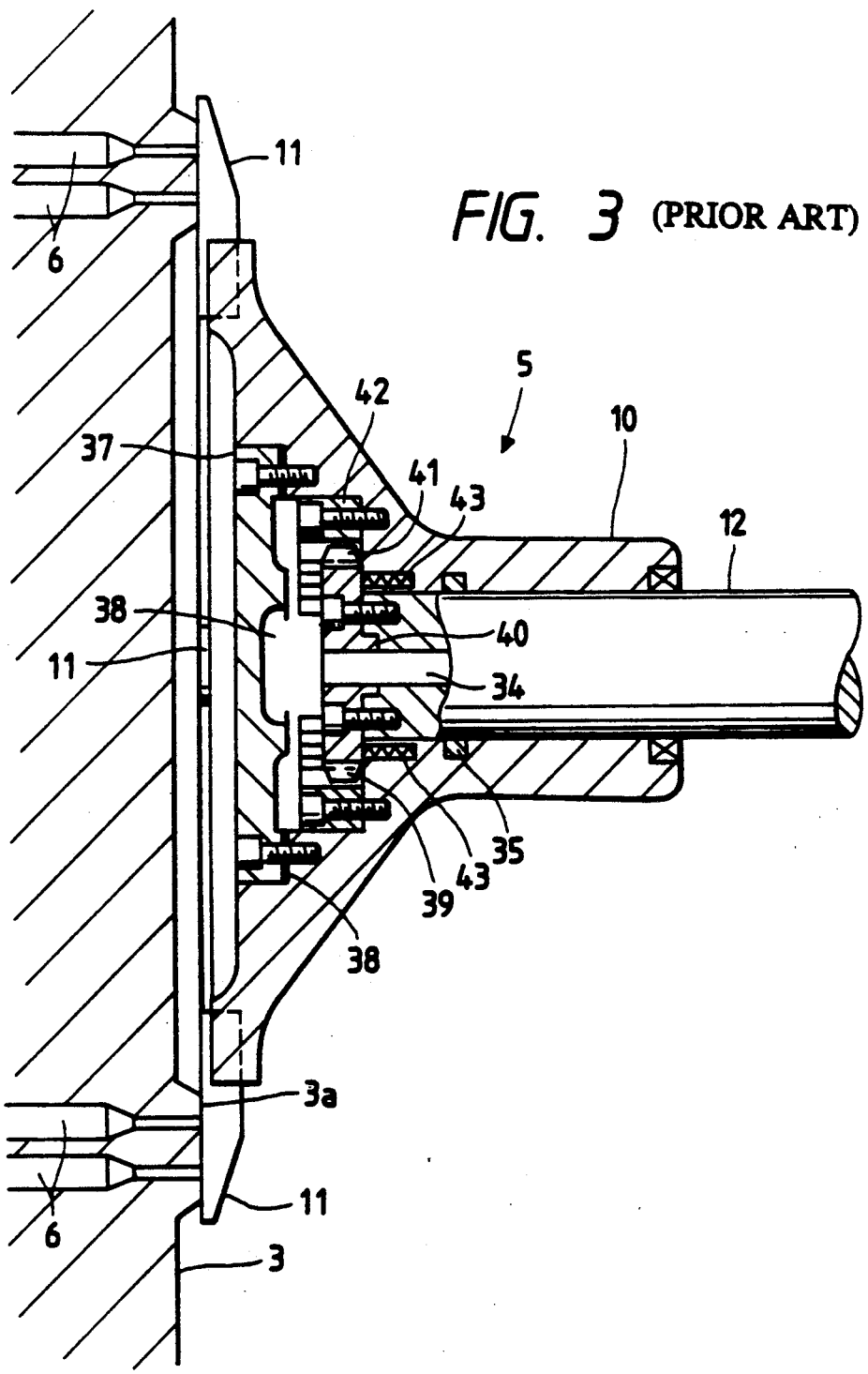

FIG. 1 is a partially sectional view showing the configuration of the plastics granulating apparatus according to the present invention.

In the drawing, the reference numeral 1 designates a granulating machine. The granulating machine 1 is constituted by a manifold 2 for circumferentially distributing melted resin extruded from an extruding machine (not shown), a die 3 mounted on the manifold 2 so as to closely contact therewith, a cutter casing 4 attached on a die surface 3a of the die 3, and a cutter 5 provided in the cutter casing 4.

The die 3 is disc-like shaped, and a large number of nozzles 6 are formed axially through a ring-like region of the die 3 surrounding the center of the same so as to communicate with a resin path 2a. One and the other ends of the nozzles 6 are opened into the ring-like resin path 2a of the manifold 2 and into the cutter casing 4, respectively.

The cutter casing 4 is made to removably closely contact with the surface of the die 3 through bolts 7. The cutter casing 4 has a hot-water inlet 8 and a hot-water outlet 9 so as to be always filled with hot water.

The cutter 5 has a configuration so that a plurality of cutter knives 11 are radially fixedly supported on the outer circumference of an end surface of a cutter holder 10 facing the die 3. The cutter knives 11 are provided so as to be in opposition to the die surface 3a of the die 3, that is, in opposition to the surface of the ring-like region through which the nozzles 6 are formed. A rotary force is transmitted to the cutter holder 10 through a cutter drive shaft 12 disposed on the central axial line of the cutter holder 10. The cutter holder 10 is removably provided on the cutter drive shaft 12 through a bolt 10a and a key groove 10b.

A housing 15 having a sleeve 52 which is axially movably provided in the housing through an O-ring 50 and a plurality of packings 51 is attached on one end of the cutter casing 4 through bolts 53. The cutter drive shaft 12 is coaxially rotatably provided in the sleeve 52 through a pair of shaft seal devices 54 and a pair of bearings 55, the cutter drive shaft 12 being held so as to be fixed axially (longitudinally) relative to the sleeve 52.

First and second space chambers 56 and 57 are formed between a rear portion 52a of the sleeve 52 and a rear portion 15a of the housing 15, and first and second holes 58 and 59 are formed in the first and second space chambers 56 and 57 so as to be communicated with the latter respectively. An axial slide mechanism 100 for the cutter knives is constituted by the cutter drive shaft 12, the sleeve 52, and the housing 15.

A radially-extending key 60 is projected outside from the rear portion 52a of the sleeve 52 through a through groove 61 formed in the rear portion 15a of the housing 15, and a detection rod 62a of a detection means 62 provided on an outer surface 15b of the housing 15 and constituted by a dial gauge and the like abuts on the key 60.

A ring-like rear cover 63 is attached on a rear end 15c of the housing 15 through bolts 64, and a stopper 66 having operation levers 65 is thread-engaged with a thread-engagement portion 63a formed in the rear cover 63.

The stopper 66 abuts on an adapter 67 coupled with the rear end 52c of the sleeve 52, and the axial stopping operation of the sleeve 52 can be obtained by rotating the stopper 66 to thereby axially move the same.

Further, a first change-over valve 70 connected, to a first pressure adjustment valve 68, and to a pressure medium source 69 having a pressure medium such as pressure air, pressure oil, or the like, is connected to the first hole 58, and, on the other hand, a second change-over valve 72 is connected to the second hole 59 through a second pressure adjustment valve 71. Further, in order to monitor the pressure of the pressure medium to be supplied into the first and second holes 58 and 59, pressure gauges 73 are connected to the pressure adjustment valves 68 and 71.

The plastics granulating apparatus according to the present invention has such a configuration as described above. Next, the granulating method according to the present invention will be described.

First, if the second pressure valve 71 is fully opened, the sleeve 52 is moved toward the die 3 in the housing 15 by the piston-like action of the pressure medium supplied to the second space chamber 57 so that the cutter knives 11 are urged against the die surface 3a. In this condition, the state of the detection means 62 at that time is set to zero.

In this condition, if the cutter drive shaft 12 is rotated by a drive means (not shown), the cutter knives 11 rotate at a high speed, and fused plastics (not shown) ejected from the nozzles 6 are finely cut by the cutter knives 11. The thus cut pellets are solidified in hot or cold water in the cutter casing 4, and sent from the hot water outlet 9 to a treatment portion (not shown) together with the hot or cold water so that the pellets are dried to be final products.

When the foregoing cutter knives 11 rotate in the water, a thrust is generated. The thrust changes in proportion to the rotational speed of the cutter knives 11, and even in an ordinary rotational speed region, the thrust extensively changes from a low-speed range into a high-speed range. This tendency is remarkable particularly in modern large capacity granulating machines 1, and the cutter drive shaft 12 is moved forward (the left direction in FIG. 1) by the generated thrust.

If the advancing of the cutter drive shaft 12 is generated, abrasion of the cutter knives 11 and defective cutting of a polymer are generated. Accordingly, the rotational speed of the cutter drive shaft 12 is detected and the first pressure adjustment valve 68 is adjusted on the basis of a signal representing the rotational speed to thereby control a pressure medium to be supplied into the first space chamber 56 and to automatically control the advancing of the cutter drive shaft 12 corresponding to the stroke value S of the first space chamber 56 so that the contacting state (that is, the contact surface pressure) between the cutter knives 11 and the die surface 3a can be controlled and kept most suitably. Further, the same function can be obtained by adjusting the adjustment valve 71, in place of the adjustment valve 68 so that the pressure of a pressure medium to be supplied into the second space chamber 56 is adjusted.

The abrasion state of the cutter knives 11, that is, the quantity of abrasion thereof and the state of abnormal retreat thereof can be observed outside the apparatus by reading the gauge of the detection means 62. Moreover, when the cutter knives 11 are to be exchanged, the bolts 7 are removed after the water in the cutter casing 4 has been discharged, and the cutter casing 4 and the housing 13 are moved by using a truck as shown in the conventional example so that the cutter holder 10 is exposed outside.

The cutter holder 10 is separated from the cutter drive shaft 12 by removing the bolt 10a from the cutter drive shaft 12 in the foregoing condition, and it is possible to easily exchange each of the cutter knives 11.

The foregoing detection means 62 is not limited to the dial gauge, but, for example, an electric detection means using a potentiometer may be used.

The plastics granulating apparatus according to the present invention has such a configuration as described above, and therefore the following effects can be obtained.

(1) The thrust against the advancing thrust generated in rotation of the cutter knives can be automatically controlled by a pressure medium, and therefore the contacting state between the cutter knives and the die surface is made most suitable to thereby make it possible to perform high-efficient granulation.

(2) The most suitable reaction can always be obtained by the pressure of a pressure medium even against a large thrust generated when the cutter knives are increased in size and in number, and high-capability granulation can be attained with a high yield.

(3) Retreat of the cutter drive shaft against the thrust can be performed in accordance with the rotational speed by determining the relation between the rotational speed and the thrust in advance, and therefore the contacting pressure between the cutter knives and the die surface can be made most suitable.

(4) Unlike the conventional example, it is possible to separate the cutter holder from the cutter drive shaft only by separating the cutter casing from the die, without allowing any oil to leak. Therefore, the cutter knives can be easily exchanged.

(5) The abrasion of the cutter knives can be observed from the outside by using the detection means to thereby make it possible to predict the life, the quantity of abrasion, and the abnormal retreat of the cutter knives, and the biting of a polymer into between the die surface and the cutter knives can be detected from the outside.

(6) Further, since the sleeve for axially moving the cutter drive shaft is prevented from rotating by a key, and since the waterproof condition is attained by the sealing structure, no leakage of a pressure medium is caused during the drive of the sleeve, and therefore maintenance can be easily performed with a high reliability.

What is claimed is:

1. A plastics granulating apparatus comprising:
   a die having a die surface;
   a cutter drive shaft coupled to a driver;
   a cutter holder, mounted on said drive shaft, having cutter knives driven to rotate along said die surface;
   a housing having said cutter drive shaft rotatably mounted therein by virtue of a sleeve, said driver being capable of rotating said cutter drive shaft so as to cause said cutter holder to rotate in a manner that plastics particles are obtained by cutting resin extruded from said die by means of said cutter knives, said sleeve being axially movably provided in said housing so as to coaxially rotatably hold said cutter drive shaft; and
   space chambers defined by said sleeve and said housing, wherein a pressure medium is supplied into said space chambers so that said cutter drive shaft moves axially with axial movement of said sleeve.

2. A plastics granulating apparatus according to claim 1, further comprising:
   adjustable valves communicated respectively with said space chambers so as to adjust a pressure of said pressure medium.

3. A plastics granulating apparatus according to claim 1, further comprising:
   detection means provided on said housing for detecting a positional relation between said housing and said sleeve so as to detect a position of said cutter knives with respect to said die.

* * * * *